Aug. 31, 1954     B. O. BENDTSEN     2,687,899
CLEVIS
Filed April 27, 1951
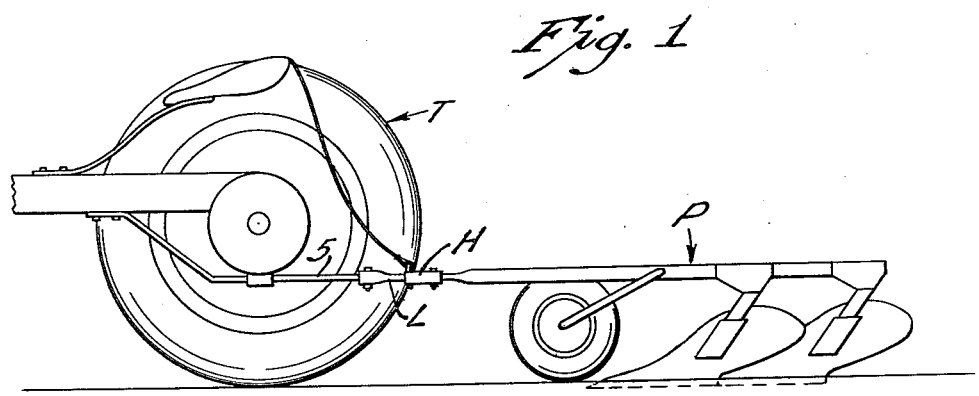
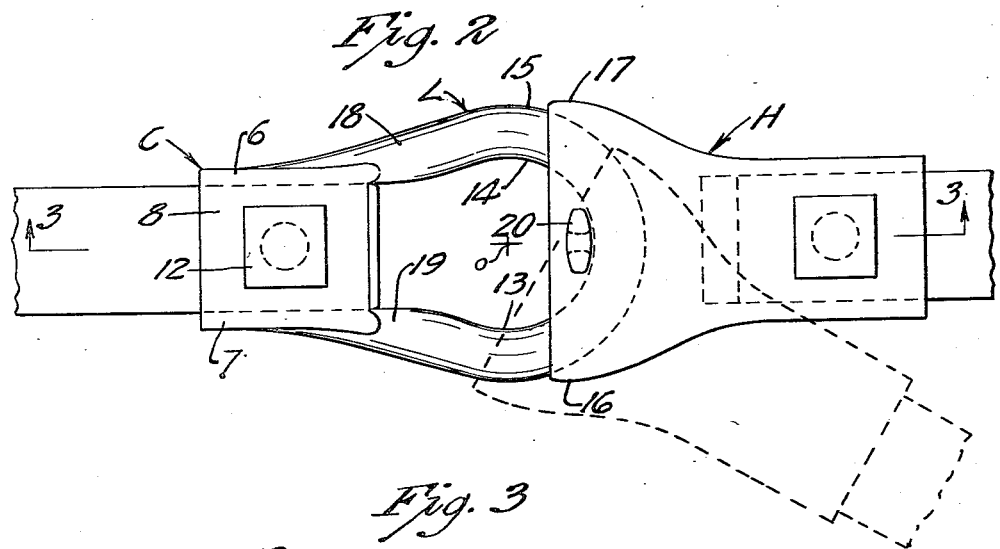
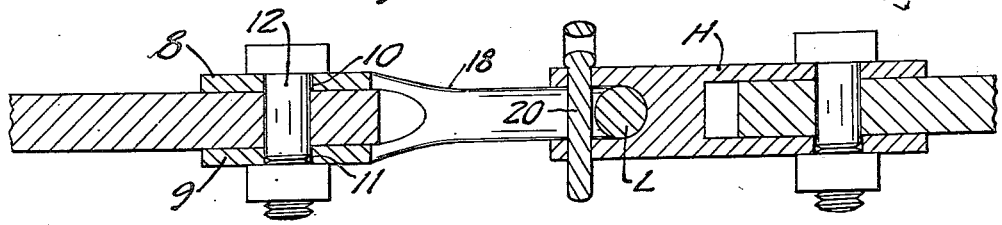
INVENTOR.
Ben O. Bendtsen
BY
Williamson & Williamson
ATTORNEYS Patented Aug. 31, 1954

2,687,899

UNITED STATES PATENT OFFICE 2,687,899

CLEVIS

Ben O. Bendtsen, Rose Creek, Minn., assignor to Bendtsen Bros. Mfg. Inc., Rose Creek, Minn., a corporation of Minnesota Application April 27, 1951, Serial No. 223,241

4 Claims. (Cl. 280—504)

This invention relates to an improved clevis for use with tractors and the like. More particularly, it relates to a clevis for use in conjunction with a type of hitch constructed to guide the clevis into proper and centered position with relation to the hitch to facilitate interconnection therebetween.

There is a certain type hitch presently being used in large numbers upon various types of agricultural implements such as plows, etc. This hitch is commonly known as a Holland Hitch and is characterized by its side walls which slant inwardly and rearwardly from its forward end portions to guide the clevis into optimum position therewithin to permit a draw-pin to be inserted within the loop member of the clevis and thereby pivotally interconnect the clevis and the hitch. These side walls are spaced apart a distance slightly greater than the width of the clevis to be used therewith along the portions thereof which will extend into the hitch when so connected. The obvious purpose is to facilitate the positioning of the clevis within the hitch into ideal position for the insertion of the interconnecting member through each of the two elements, the clevis and the hitch. It has been found, however, that large numbers of these hitches have had their side walls broken away by the clevis normally in use when making a sharp turn to either side. This of course weakens the hitch substantially and even more important, destroys the effectiveness of the hitch for guiding a clevis into proper hitching position. My invention is directed toward providing a clevis which will eliminate the breaking away of the side walls of such a hitch.

It is a general object of my invention to provide a novel and improved tractor clevis of cheap and simple construction and improved efficiency.

A more specific object is to provide a tractor clevis constructed to permit a freely pivotal connection with a Holland-type hitch without danger of breaking out the side walls of the latter during turning operations.

Another object is to provide a tractor clevis constructed to facilitate the guidance of the same into the interior of a hitch of the Holland-type.

These and other objects and advantages of my invention will be more apparent from the following description made in connection with the accompanying drawings, wherein like reference characters refer to similar parts throughout the several views and in which:

Fig. 1 is a side elevational view showing a plow bearing a Holland-type hitch connected to the drawbar of a tractor with one embodiment of my invention.

Fig. 2 is a plan view of one embodiment of my invention positioned within a Holland-type hitch.

Fig. 3 is a vertical sectional view taken along line 3—3 of Fig. 2.

One embodiment of my invention may include as shown in Figs. 1–3 a channel member indicated generally as C and a circularly shaped loop member indicated generally as L. As best shown in Figs. 1 and 2 my clevis is adapted to be connected to the rear end portions of a drawbar 5 of tractor T and is designed for use in conjunction with a Holland-type hitch indicated generally as H and mounted upon a plow P.

As shown, the channel member C is generally rectangular in shape and is provided with a pair of opposite side walls 6 and 7, a top wall 8, and a bottom wall 9. The channel formed by these walls 6, 7, 8 and 9 is of a dimension complementary to the external dimension of the drawbar 5 so as to receive the latter therewithin in sliding and snug-fitting relation. The top wall 8 and the bottom wall 9 as best shown in Fig. 3 is provided with a pair of vertical aligned apertures 10 and 11 to receive a draw-pin or bolt 12 therethrough to secure the channel member C to the drawbar 5.

The loop member L is circular in cross sectional shape, as best shown in Fig. 3, and is reversed upon itself so that the entire loop is substantially circular in shape, as best shown in Fig. 2, the center of its curvature being approximately at the point indicated as 13. It should be noted that the inner periphery 14 and the outer periphery 15 of the loop member L are each substantially circular in shape and that the side walls 16 and 17 of the Holland-type hitch H extend substantially tangential to the outer periphery 15 of the loop member adjacent the forwardmost portions of the hitch. As can be best seen in Fig. 2, the center of curvature of the loop member L is normally disposed substantially ahead of the forward end of the hitch H and the radius of the curvature of its outer periphery is slightly greater than one-half the distance between the inner walls of the hitch at its forwardmost portions. This center of curvature has been indicated in Fig. 2 by the letter O. The loop member L is fixedly secured to the channel member C by connecting elements 18 and 19. These connecting elements may be separate elements or may be formed integrally with the channel member C and the loop member L as shown in Figs. 1–3.

In operation the clevis is secured to the drawbar 5 of the tractor T as shown in Figs. 1–3 and the tractor is moved rearwardly so that the loop member L will extend partially into the hitch H. The side walls 16 and 17 of the hitch will guide the loop member L into central position with respect to the hitch H, accomplishing this guidance through the circular exterior surface 15 of the loop member L. Thereafter the draw-pin 20 normally associated with the hitch H may be inserted to interconnect the clevis and the hitch.

The most important advantage of my clevis is that during turning operations, because of the circular shape of the loop member L, the clevis will pivot freely about the draw-pin 20 and turn within the hitch H without breaking out the side walls 16 and 17 of the hitch. In other words it is possible when using my hitch to make a sharp turn to either side without danger of breaking out the side walls and consequently destroying the surface of the hitch for guiding the clevis into its interior during subsequent hitching operations. The loop member L will turn freely within the hitch H and draw the plow behind it without any damage whatsoever to the hitch. This is impossible with any type of clevis currently known or used in conjunction with tractors.

It should be noted that the circular shape of the outer surface 15 of the loop member L facilitates the guidance of the loop member into the interior of the hitch H. In other words it is not necessary to back the tractor into an exact position to connect the hitch to the loop member, for so long as the loop member enters the hitch in any respect whatsoever the side walls of the hitch will cooperate with the circular outer surface 15 to cause the two to align in optimum hitching position.

It will, of course, be understood that various changes may be made in the form, details, arrangement and proportions of the parts without departing from the scope of my invention.

What I hereby claim is:

1. A clevis for connecting the drawbar of the tractor with a load having a hitch of the type having upright side walls extending diagonally inwardly and rearwardly from the forward edge portions thereof and adapted to guide such a clevis into the interior of the hitch for securement thereto by a pin inserted through the hitch and clevis, said clevis comprising a strong rigid channel member of interior dimensions but slightly greater than the cross-sectional dimensions of the drawbar and adapted to receive the drawbar therewithin in sliding relation and to surround the same in snug-fitting relation, said channel member being adapted to be secured to the drawbar at a relatively fixed position along the length of the drawbar, and a strong rigid loop member fixedly secured to said channel member and extending rearwardly therefrom, said loop member having at least its rearwardmost portions curved in a substantially circular shape, the radius of curvature of said rearwardmost portions being slightly greater than one-half the distance between the upright side walls of the hitch adjacent their forwardmost portions and the center of curvature of said rearwardmost portions of said loop normally being substantially ahead of the forwardmost portions of said side walls to permit said loop member to be guided and received into the interior of such a hitch and to permit the same to turn freely to either side of the longitudinal center of such hitch while therewithin without danger of breaking out the side walls of the hitch.

2. A clevis for connecting the drawbar of a tractor with a load having a Holland-type hitch, the drawbar having a vertical aperture, said clevis comprising a strong rigid channel member adapted to receive the rear end portion of the drawbar therewithin in snug-fitting relation, said channel member having a vertical bore extending therethrough for vertical alignment with the vertical aperture of the drawbar to receive a draw-pin therein and thereby interconnect the draw-bar and said channel member, and a strong rigid loop member fixedly secured to said channel member and extending rearwardly therefrom, said loop member having at least its rearward portions formed in a substantially circular shape, the radius of curvature of the outer periphery of said loop member being slightly greater than one-half the distance between the inner surfaces of the side walls of such hitch adjacent its forwardmost portions and the center of such curvature normally being substantially ahead of the forwardmost portions of said side walls to permit said loop member to be guided and received into the interior of such a hitch and to permit the same to turn freely to either side of the longitudinal center of such hitch while therewithin without danger of breaking out the side walls of the hitch.

3. A clevis for connecting the drawbar of a tractor with a load having a hitch of the type having upright side walls extending diagonally inwardly and rearwardly from the forward edge portions thereof and adapted to guide such a clevis into the interior of the hitch for securement thereto by a pin inserted through the clevis, said clevis comprising a strong rigid channel member of interior dimensions but slightly greater than the cross-sectional dimensions of the draw-bar and adapted to receive the drawbar therewithin and to surround the same in snug-fitting relation, said channel member being adapted to be secured to the drawbar at a fixed position along its length, and a strong rigid loop member fixedly secured to said channel member and extending rearwardly therefrom, said loop member being substantially circular in cross-section and having at least its rearwardmost longitudinal portions curved into a substantially circular shape, the radius of said curvature being slightly longer than one-half the distance between the inner surfaces of each of the upright side walls of the hitch adjacent its forwardmost portions and the center of such curvature normally being substantially ahead of the forwardmost portions of said side walls whereby said loop member may be guided and received within such a hitch and secured thereto by such a pin and whereby said loop member may turn freely about such pin to either side of the longitudinal center of such hitch without breaking out the side walls of the hitch.

4. A clevis for connecting the drawbar of a tractor with a load having a hitch of the type having upright side walls extending diagonally inwardly and rearwardly from the forward edge portions thereof to guide a clevis into the interior of the hitch for securement thereto by a draw-pin inserted through the clevis, the drawbar having a vertical aperture, said clevis comprising a strong rigid channel member adapted to receive the rear end portion of the drawbar therewithin in snug-fitting relation, said channel member having a vertical bore extending therethrough for vertical alignment with the vertical aperture of the drawbar to receive a draw-pin therein to interconnect the drawbar and said channel member, and a strong rigid loop member of circular shape fixedly secured to said channel member and extending rearwardly therefrom, the radius of curvature of the outer periphery of said loop member being slightly greater than one-half the distance between the inner surfaces of each of the upright side walls of the hitch adjacent their forward portions, the inner diameter of such loop member being sufficient to cause said loop member to receive such a draw-pin therethrough when within such hitch and the center of curvature of the outer periphery of said loop member normally being disposed substantially ahead of the forwardmost portions of such hitch when such draw pin is so received whereby said loop member may be guided and received within such a hitch and secured thereto by such a draw-pin and whereby said loop member may turn freely about such draw-pin to either side of the longitudinal center of such hitch without danger of breaking out the side walls of the hitch.

References Cited in the file of this patent

UNITED STATES PATENTS

| Number | Name | Date |
|---|---|---|
| 135,360 | Pitts | Jan. 28, 1873 |
| 250,426 | Coombe | Dec. 6, 1881 |
| 416,367 | Johnson | Dec. 3, 1889 |
| 1,437,836 | Ferris | Dec. 5, 1922 |

FOREIGN PATENTS

| Number | Country | Date |
|---|---|---|
| 14,210 | Great Britain | of 1904 |
| 334,170 | Italy | Apr. 16, 1935 |